United States Patent [19]

Scodino

[11] 4,352,595
[45] Oct. 5, 1982

[54] APPARATUS FOR AND METHOD OF SUPPORTING PIPE SUSPENDED OVER DEPRESSIONS IN THE SEA BED

[75] Inventor: Ambrogio Scodino, S. Donato MI, Italy

[73] Assignee: Saipem S.p.A, Milan, Italy

[21] Appl. No.: 150,418

[22] Filed: May 16, 1980

[30] Foreign Application Priority Data

May 29, 1979 [IT] Italy .............................. 23083 A/79

[51] Int. Cl.³ ............................................. F16L 1/04
[52] U.S. Cl. .................................. 405/158; 405/172; 405/228
[58] Field of Search .............................. 405/154–158, 405/172, 188, 190–191, 228

[56] References Cited

U.S. PATENT DOCUMENTS 4,084,385  4/1978  Boyodjieff .......................... 405/228
4,146,345  3/1979  Silvestri ............................. 405/172
4,265,566  5/1981  Scodino ............................. 405/172

Primary Examiner—David H. Corbin
Assistant Examiner—Nancy J. Pistel
Attorney, Agent, or Firm—Morgan, Finnegan, Pine, Foley & Lee

[57] ABSTRACT

Apparatus for supporting pipe suspended over depressions in the sea bed and method of, comprising a service modular unit capable of being completely recovered and another modular unit intended for properly supporting the pipe: the two modular units are so connected that they can be disjointed under a command from the pipe-laying barge.

The service modular unit is equipped with a recoverable assembly for placing the supporting modular unit in a correct vertical posture on the sea bed and for vertically holding such supporting modular until the pile-driving operation has been satisfactory completed.

4 Claims, 8 Drawing Figures

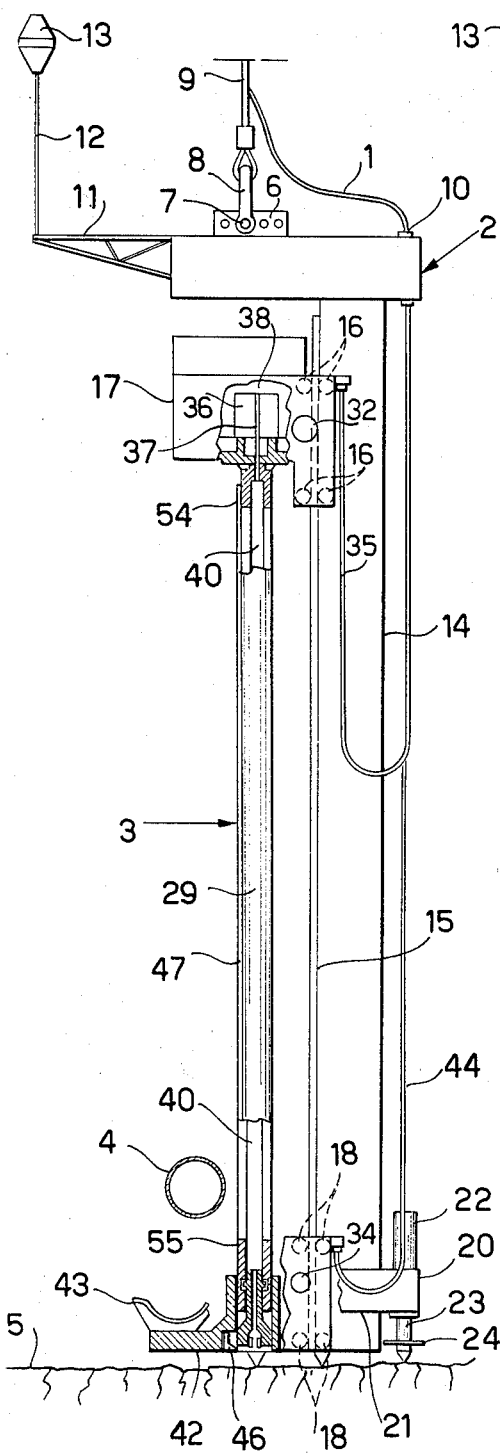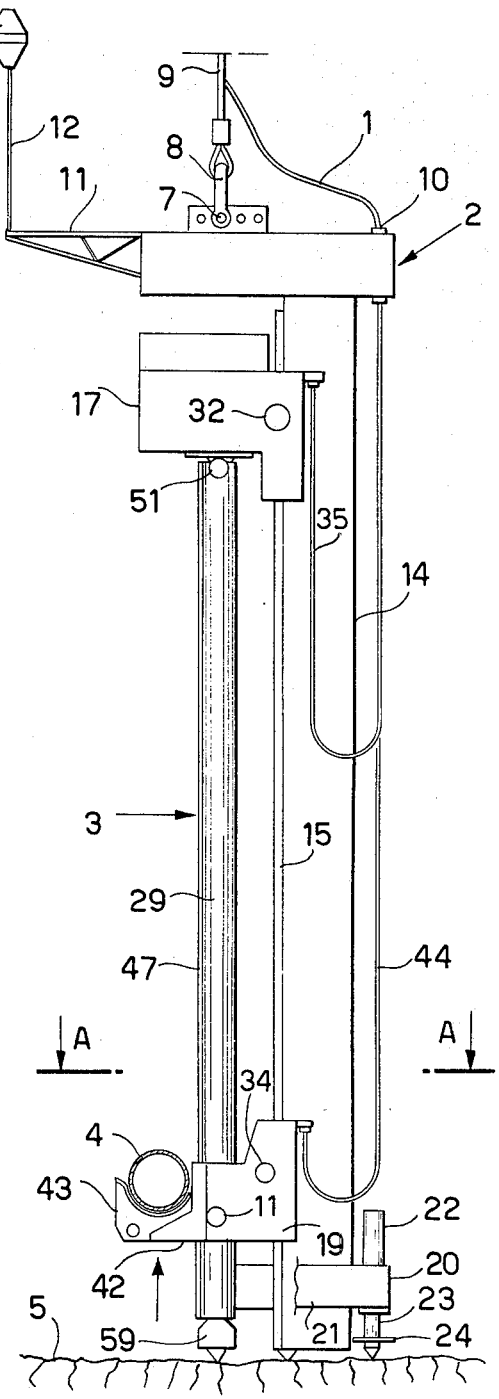

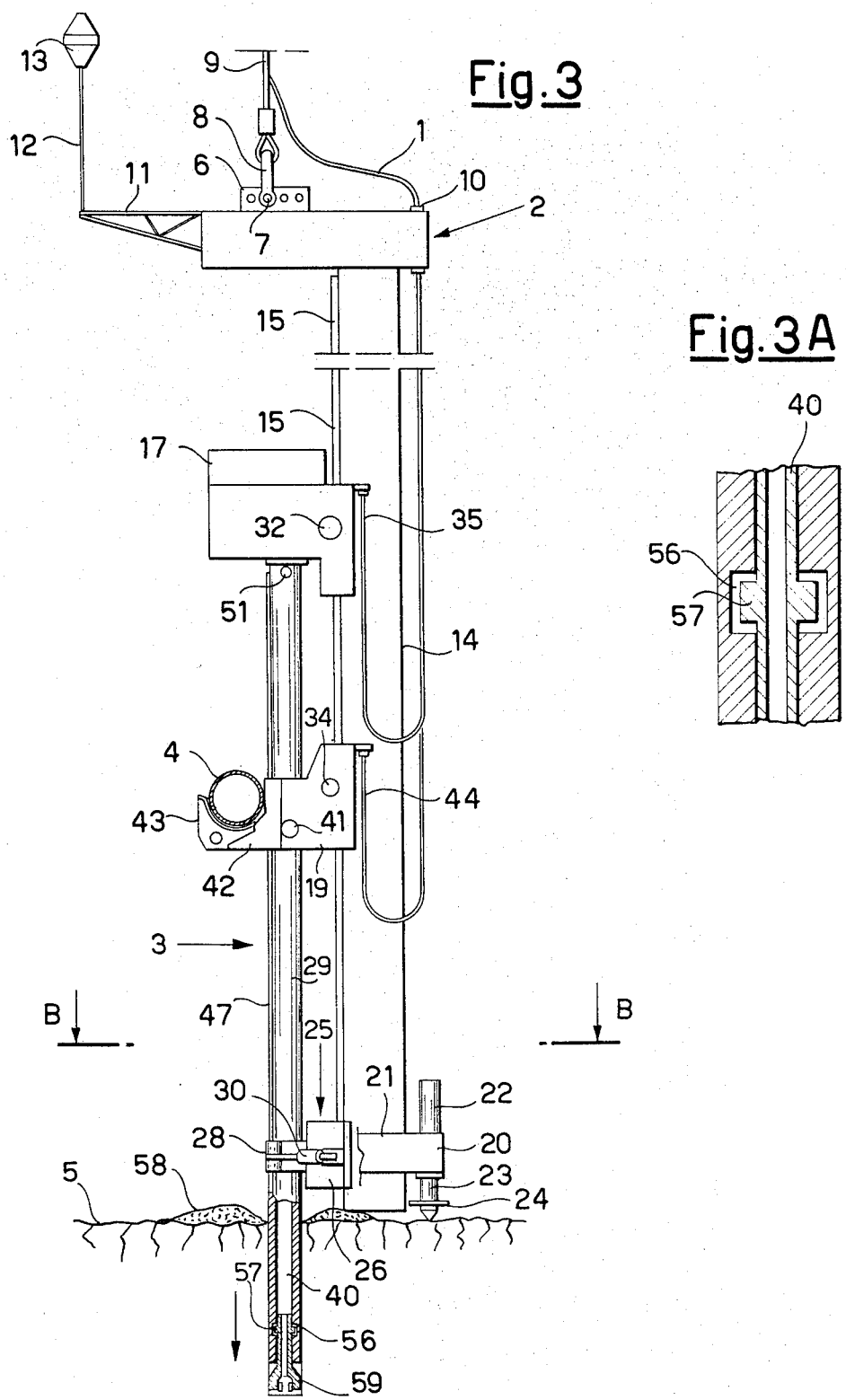

APPARATUS FOR AND METHOD OF SUPPORTING PIPE SUSPENDED OVER DEPRESSIONS IN THE SEA BED

This invention relates to an improved apparatus for and method of supporting pipe suspended over depressions in the sea bed, including those situated at great depth.

U.S. patent application Ser. No. 18,429, filed on Mar. 7, 1979, now U.S. Pat. No. 4,265,566 issued May 5, 1981, describes an apparatus for supporting underwater pipe, constituted by a completely recoverable service module and a support module which serves to support the pipe and remains fixed on the sea bed.

The support module of the known apparatus has an internally hollow pile of circular cross-section, along which a slide can move and be fixed in the required position, this slide being in the form of a bracket on which is disposed an inclinable seat which serves to receive and lock the pipe to be supported. The pile is connected to the service module by a collar disposed in the lower part of the module and provided with a clamp by means of which the pile can be coupled to or uncoupled from said module. Within the pile there is a rod driven by an electric motor housed in the service module and provided at its lower end with a cutter having a diameter slightly greater than the outer diameter of the pile.

The service module consists of a casing containing a constant tension winch for supporting the slide which slides along the pile, means for coupling and uncoupling the support module, means for rotating the rod provided with the cutter, means for removing the debris produced during drilling, and hydraulic means and solenoid valves for operating the various members with the necessary electricity being supplied by a cable connected to the depot ship, from which all the necessary controls originate. The service module is supported by a constant tension winch disposed on the depot ship. The apparatus for supporting the underwater pipe is therefore constituted by the support module, and this is installed on the sea bed in the following manner.

The service module with the support module coupled to it is lowered into the sea by the support cable operated by the constant tension winch disposed on the depot ship, until the cutter point is close to the sea bed; the pile of the support module is brought close to the pipe to be supported, and the slidable slide is raised until the pipe is locked on the seat and the service module is lowered until the cutter point touches the sea bed, simultaneously raising the slide supporting the pipe gradually as the pile is lowered; the pump is operated for removing the debris, and the cutter is rotated which, acted upon only by the weight allowed by the constant tension winch of the depot ship, begins to drill the sea bed and continues to do this until the pile has become inserted to the predetermined length; the constant tension of the winch located on board the depot ship is gradually released such that the apparatus acts with all its weight on the sea bed; the cable of the constant tension winch mounted on the service module is uncoupled from the slide after fixing the slide in the position reached; and the pile is uncoupled from the service module, which is recovered, whereas the pile with the cutter rod and the pipe support slide remain on the sea bed.

This known apparatus has serious drawbacks when the support module has to be initially positioned under the pipe to be raised in sea conditions in which the visibility of the sea bed is reduced, when the currents are strong and when the sea surface is rough. In this case, it becomes extremely difficult to arrange the pile vertically on the sea bed and on the side of the pipe to be raised, because of the vertical and horizontal swinging motion which the entire apparatus is subjected. As a consequence the pile can become inserted on the incline, and recline with the pipe if the sea bed is muddy, or the pile can fracture if the sea bed is rocky.

The present invention provides an improved apparatus for and method of supporting underwater pipes, which obviates the aforesaid drawbacks and can be installed on the sea bed in a perfectly vertical position whatever the sea conditions and the geological characteristics of the sea bed.

As in the case of the known apparatus, the improved apparatus includes a recoverable service module and a support module which is left on the sea bed. However, the service module of the present invention is provided with recoverable means for arranging the support module in a vertical position on the sea bed, and for maintaining it in this position during the entire operation involved in driving the support module pile into the sea bed. The service module includes a vertical upright of square or rectangular cross-section, provided at its upper end with a horizontal beam terminating in a trellis bracket, the free end of which is connected to a float, said beam being coupled to the support cable wound on a constant tension winch disposed on the depot ship.

The vertical upright is provided at its lower end with three horizontal arms, at the ends of which are fixed three vertical hydraulic cylinders, the pistons of which terminate in points provided with support discs to form a type of tripod on which the vertical upright structure rests.

The extent to which the pistons emerge from the cylinders is adjusted by a verticality sensor disposed in said horizontal beam connected to the upper end of the upright, so that the structure assumes a perfectly vertical position.

Moreover, the structure forming the vertical upright is provided on one of its sides with a rack and two lateral guides, along which can slide a first carriage driven by an electric motor, and constituted by recoverable control head which by means of a pin supports the upper end of the pile of the support module, and on which is disposed the electric motor which drives the rod rotating inside said pile for drilling the sea bed. A second carriage is provided with an electric motor and a pinion engaged in the rack for movement along the upright. This second carriage is connected to the slide in the form of a bracket containing the pipe support seat, by means of remotely operable fixing pins, and the slide is slidable along the support module pile as in the case of the known art.

The two carriages constitute the two support and guide points necessary for the support pile to be maintained constantly parallel to the vertical axis of the service module during drilling of the sea bed and inserting the pile.

When the pipe to be supported is at a considerable distance from the sea bed, a third guide point is provided in order to prevent the lower end of the pile from becoming displaced from its position parallel to the vertical axis of the service module. This third guide point is fixed to the lower part of the vertical upright and is constituted by a box provided with two jaws which keep the pile locked during insertion, and are operable by means of two hydraulic pistons. When the operation is terminated, the two jaws are opened, the control head is uncoupled from the rotating rod, the second carriage is removed from the pipe support bracket, and the service module is recovered with the carriages and lower pile guide, leaving the support module with the tube support bracket inserted in the sea bed.

The method includes lowering by means of a support cable operated by the constant tension winch disposed on the depot ship until the lower end of the upright is in proximity to the sea bed the apparatus of the invention including the service module to which is coupled the support module with the carriage for raising the support bracket positioned at the lower end of the support pile, or higher if the height of the pipe above the sea bed is such as to require the use of a pile guide; positioning the apparatus by means of the articulated arm of a submersible craft in such a manner that the horizontal arm of the service module is perpendicular to the pipe to be supported; making the apparatus approach the pipe until the pile is separated from it by only a short distance; arranging the apparatus in a vertical position on the sea bed by operating the hydraulic pistons provided with point ends and support discs; raising the carriage along the support pile until the pipe to be supported comes into contact with the support seats and is then raised by the amount necessary to eliminate excessive curvature; separating the submersible craft from the arm of the service module; gradually releasing the constant tension of the winch located on board the depot ship such that the apparatus acts with all its weight and part of the weight of the portion of supported pipe on the sea bed; operating the pump to remove the debris from the bottom of the excavation and operating the cutter fixed to the lower end of the pile so as to drill the sea bed; simultaneously starting the head carriage motor so that the head, by way of the pinion engaged in the rack on the upright, begins to move slowly in a downward direction along the upright until the pile is inserted to the predetermined length without allowing the head to touch the top of the carriage for raising the pipe support seat by virtue of the operation at this point of a device for stopping the lowering motion of the head and the rotary motion of the cutter; removing the pin which fixes the pile to the control head and the pin which fixes the second carriage to the pipe bracket support, and possibly opening the jaws of the lower pile guide, so that the pile and cutter rod can be abandoned on the sea bed; and recovering the service module on to the depot ship so that it is ready to receive another pile for inserting into the sea bed.

The foregoing and other characteristics of the invention are explained in the following detailed description and accompanying drawings of a preferred embodiment of the invention. It is to be understood that the invention is capable of modification and variation apparent to those skilled in the art within the spirit and scope of the invention.

In the drawings:

FIG. 1 is a side view of the apparatus according to the invention, with a partial section through the head and first carriage, at the moment in which the apparatus is arranged to the side of the pipe to be supported, with the second carriage positioned below this pipe.

FIG. 2 is a side view similar to FIG. 1, but when the second carriage with the pipe support seat is raised by the amount necessary for the pipe to be supported on it and slightly lifted.

FIG. 3 is a side view of the apparatus during the drilling of the sea bed, the apparatus being provided with the pile guide because in this case the pipe to be supported is at a considerable height above the sea bed, and much greater than in the case illustrated in FIGS. 1 and 2.

FIG. 3A is a detailed sectional view showing the connection between the lower end of the rod and the pile.

Figure 5:
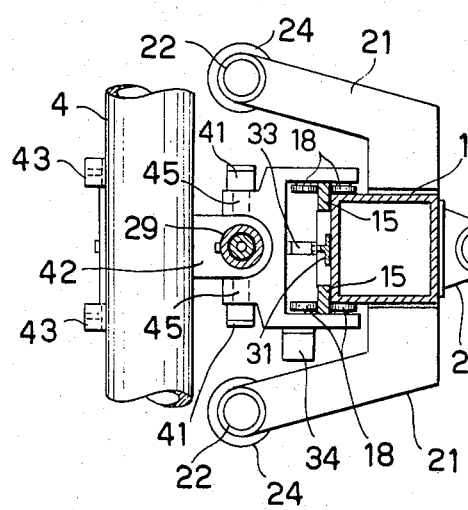
FIG. 5 is a section through the apparatus of FIG. 2 on the line A—A.

The apparatus shown in FIGS. 1, 2 and 3 according to the present invention is composed of the service module 2 and support module 3 for supporting the pipe 4, which also can be on a very inclined sea bed 5.

The service module 2 is coupled at its upper end by means of a plate 6 having bores therein, pins 7 and a ring 8 to the special support cable 9. The cable 9 also serves for transmitting electricity and the signals for controlling from the depot ship the solenoid valves in the electro-hydraulic installation disposed in the service and support modules (not shown). The electric cable 1 is separated from the support cable 9 and is connected to the service module 2 by way of the socket 10. On the same side as the pipe 4, the service module 2 also is provided with the arm 11, the free end of which is provided with the cable 12 supported by the float 13 to facilitate gripping of the arm 11 by the articulated arm of the submersible craft (not shown).

Figure 6:
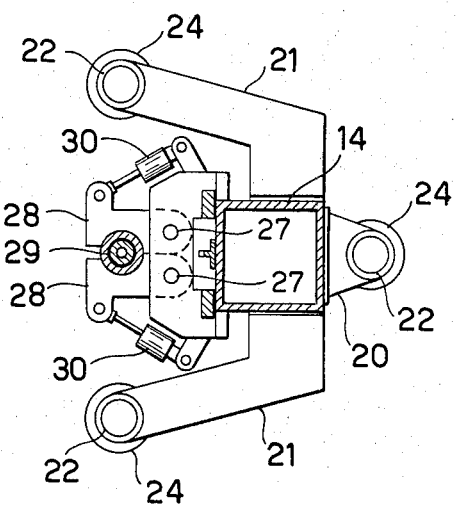
FIG. 6 is a section through the apparatus of FIG. 3 provided with the pile guide, taken on the line B—B.

The main body of said service module 2 is constituted by the upright 14 of rectangular cross-section, as shown in FIG. 5, on which are welded the two slide guides 15 on which both the wheels 16 of the carriage of the head 17 and the wheels 18 of the carriage 19 are mounted. In addition, the three horizontal arms 20 and 21 are welded to the lower part of said upright 14, and to their ends are fixed the three hydraulic cylinders 22, the pistons 23 of which terminate in points provided with support discs 24. The pile guide 25, which the upright 14 comprises when the pipe is at a considerable height above the sea bed (see FIGS. 3 and 6), is formed from the box 26 in which are welded the two pins 27, about which the jaws 28 can rotate and are tightened against the pile 29 by the action of the two hydraulic cylinders 30 pivoted to said box 26. A rack 31 is welded along the upright 14 of said service module 2 (see FIGS. 3 and 5) between the two slide guides 15, and is engaged by the pinion, not shown, of the electric motor 32 to enable the head 17 to slide along the upright 14, and by the pinion 33 of the electric motor 34 to enable the carriage 19 to slide along the upright 14.

The head 17 receives the electricity necessary for operating its motors and the release system for the pile 29, from the cable 35 which branches from the socket 10. One of its motors is the motor 32, and the other motor is the motor 36 shown in FIG. 1, the shaft 37 of which rotates with its upper end in the thrust bearing 38, its lower end being inserted, with the aid of a key, into the well 39 in the drilling rod 40 which when driven by the motor 36 rotates inside the pile 29, and supports and guides it.

Figure 7:
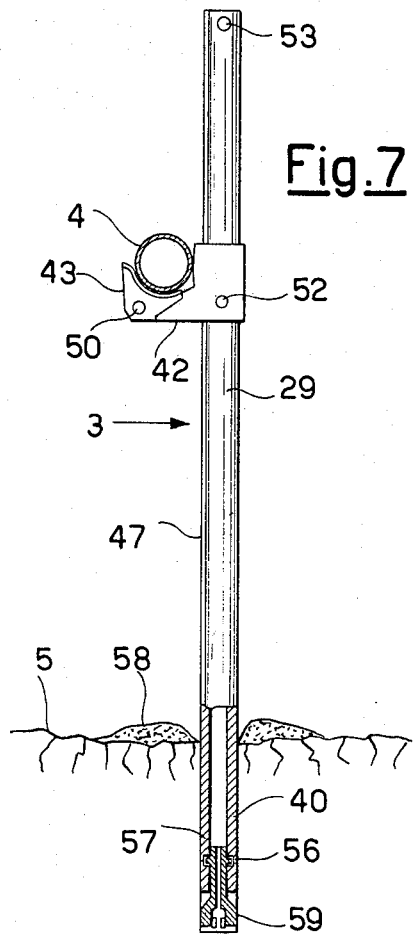
FIG. 7 shows the support module inserted into the sea bed on termination of operations supporting the pipe a substantial distance from the sea bed.
Figure 4:
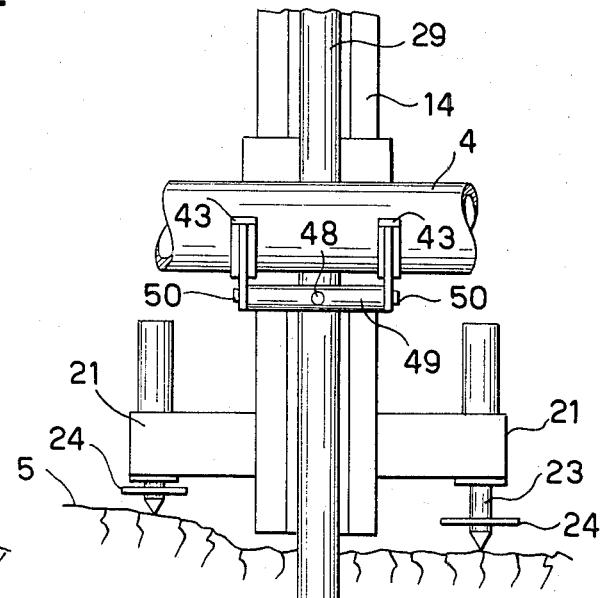
FIG. 4 is a front view of the lower part of the apparatus shown in FIG. 2, the view being taken on the same side as the pipe.

The carriage 19 receives electricity from the cable 44 branching from the socket 10. The electricity is necessary for operating the motor 34 and the coupling system 41 for the bracket support 42 of the seats 43 which are required to support the pipe. That annular part of the bracket support 42 which embraces the pile 29 (see FIGS. 5 and 7) is provided with two cavities 52 into which the two hydraulic pistons 45 of the coupling system 41 controlled from the depot ship become inserted. In addition, the bracket support 42, coupled to the carriage 19 by the system 41, can slide along the pile 29 and can be fixed at the required height by a gullet tooth 46 (FIG. 1) provided with a spring not shown, which becomes inserted into one of the notches in the rack 47 on the pile 29. The bar 49 of the bracket support 42 (see FIG. 4) can swivel about the pin 48 perpendicular to the pipe axis, and the seat 43 on which the pipe rests can swivel about the pins 50 parallel to the pipe axis.

The swivel movements are limited to a few tens of degrees by limit stops.

The support module 3 is constituted both by the bracket support 42 provided with the seats 43, and by the main body, namely the pile 29, provided with the rack 47. The pile 29 is coupled at its top to the head 17 by the coupling system 51, which is controllable from the depot ship and is similar to the coupling system 41 and formed from two hydraulic pistons provided on the lower surface of the head 17 and inserting into the two bores 53 shown in FIG. 7 at the upper end of the pile 29. The pile 29 (see FIG. 1) also is provided, in the top of its interior, with the circular bushing 54, and in the bottom of its interior with the circuit bushing 55, which also serves for connecting the rod 40 to the pile 29, by way of the circular cavity 56 (FIGS. 3 and 3A) inside which the ring 57 fixed to the rod 40 can rotate. The rod 40 is hollow internally for the passage of the water for removing the debris 58 resulting from the drilling, and is driven by a hydraulic motor, not shown, housed inside the head 17. The rod 40 is provided at its bottom with a cutter 59.

I claim:

1. In apparatus for supporting pipe suspended over depressions in the sea bed, even at great depths, having a service module and a support module for supporting the pipe, the improvement which comprises:
   a support module which has a pile adapted to be inserted into the sea bed that has a rotatable rod at its upper end which drills said pile into the sea bed, and
   a recoverable service module which is connected to said support module in such a manner that it can be separated therefrom by remote control means and which arranges and maintains said support module in a vertical position on the sea bed as said pile is inserted into the sea bed, including:
   (a) a vertical upright having at its upper end a horizontal beam terminating in a bracket, the free end of which is connected to a float, and having at its lower end three horizontal arms, at the ends of which are fixed three vertical hydraulic cylinders with adjustable pistons that terminate in points provided with support discs to form a tripod structure on which the upright rests,
   (b) a rack and two lateral guides fixed longitudinally to one side of said vertical upright,
   (c) a first electric motor-driven carriage slidable along said rack and lateral guides having a recoverable control head which contains an electric motor that engages and rotates said rod for drilling said pile into the sea bed, and coupling means releasably connecting said head to the upper end of the pile adapted to release said head from said pile after the vertical insertion thereof into the sea bed,
   (d) a second carriage having an electric motor and a pinion which engages said rack for movement along said vertical upright,
   (e) a bracket-shaped slide having a seat for supporting the pipe wherein said slide is connected to said second carriage and is slidable along the pile of the support module,
   (f) coupling means releasably connecting the second carriage to said bracket-shaped slide adapted to release said slide when the pipe is seated and suspended over the depression on the sea bed, and
   (g) a cable adapted to be under tension connected to said service module for lowering said module to the sea bed and for recovering said sevice module after the pipe is seated and suspended over the depression on the sea bed and said service module is separated from said support module.

2. An apparatus as claimed in claim 1, wherein the service module includes a guide for the support module connected to the lower part of the vertical upright having a box provided with two hydraulically operated jaws which embrace the pile and maintain it parallel to the axis of the upright during its insertion.

3. In a method for installing apparatus on the sea bed which supports pipe suspended over depressions even at great depths, wherein the apparatus includes:
   a support module having a pile for vertical insertion into the sea bed, a rotatable rod at its upper end for driving the pile into the sea bed, a cutter at its lower end for drilling into the sea bed, and a slide with a seat for the pipe which is slidable along the pile for suspending the seated pipe over the depression,
   a recoverable service module releasably connected to the support module having a vertical upright with a horizontal beam at its upper end which terminates in a bracket, the free end of which is connected to a float, and with three horizontal arms, at the ends of which are fixed three vertical hydraulically operated and vertically adjustable pistons that terminate in points provided with support discs, a first electric motor-driven carriage slidably connected to one side of the upright with a recoverable control head releasably connected to the upper end of the pile of the support module which contains an electric motor that rotates the rod inside the pile, and a second carriage slidably connected to the same side of the upright and releasably coupled to the slide with the seat for the pipe, and
   a cable adapted to be under tension connected to the service module for lowering the modules to the sea bed and for recovering the service module, the steps comprising:

lowering the connected modules to the sea bed at or near the depression by means of the cable under tension, positioning the connected modules by gripping the bracket so that the horizontal beam of the service module is perpendicular to the pipe to be supported, moving the connected modules with the positioned horizontal beam toward the pipe until the pile of the support module is separated therefrom by a short distance and the seat is below the pipe, arranging the connected modules in a vertical position on the sea bed by adjusting the height of the pistons with the points in the sea bed and the supporting discs thereon, raising the second carriage and its releasably connected seat along the vertical upright and pile, respectively, until the seat contacts the pipe and then raising the second carriage and seat to remove any excessive curvature in the seated pipe, gradually releasing the cable tension so that the weight of the connected modular and pipe act on the sea bed, concurrently drilling the sea bed with the cutter of the pile while lowering the first electric driven carriage to insert the pile vertically into the sea bed a distance sufficient to properly suspend the seated pipe over the depression, releasing the recoverable head and carriages of the service module from the support module, and recovering the service module by means of the connected cable.

4. The method of claim 3, comprising stopping the lowering of the first carriage before it contacts the second carriage.

* * * * *